United States Patent [19] [11] 3,927,566
Zanker [45] Dec. 23, 1975

[54] FLOWMETERS

[75] Inventor: Klaus Joachim Zanker, Luton, England

[73] Assignee: Kent Instruments Limited, Luton, England

[22] Filed: July 12, 1974

[21] Appl. No.: 488,234

Related U.S. Application Data

[63] Continuation of Ser. No. 263,173, June 15, 1972, abandoned.

[30] Foreign Application Priority Data

June 17, 1971 United Kingdom............... 28510/71

[52] U.S. Cl............................................. 73/194 VS
[51] Int. Cl.² ....................... G01F 1/00; G01P 5/10
[58] Field of Search ...................................... 73/194

[56] References Cited
UNITED STATES PATENTS

| | | | |
|---|---|---|---|
| 2,813,424 | 11/1957 | Liepmann et al..................... | 73/194 |
| 3,572,117 | 3/1971 | Rodley................... | 73/194 |
| 3,693,438 | 9/1972 | Yamasaki et al. .................... | 73/194 |

*Primary Examiner*—Herbert Goldstein
*Attorney, Agent, or Firm*—Young & Thompson

[57] ABSTRACT

A flowmeter has a bluff body extending across a conduit for receiving a fluid flow and sensing means responsive to disturbances of the fluid flow caused by the body, the sensing means being carried by the body.

The body can be a rigid unitary body fixed within the conduit, the sensing means responding directly to vortices shed by the body. The body can instead be movable in response to the vortex shedding, either as a whole relative to means securing it within the conduit, or alternatively the body has a wall portion which moves relative to the rest of the body. The wall portion movement is sensed directly, or by secondary fluid flow within the body.

In another form of flowmeter, the body has portions, one directly downstream of the other so that switching of the direction of fluid flow between the bodies occurs, the downstream body portion being fixed or secured to the upstream body portion either for pivotation with respect thereto, or for pivotation therewith.

The sensing means can comprise heat loss or temperature sensing means or the mechanical movement can be sensed capacitatively or magnetically.

11 Claims, 15 Drawing Figures

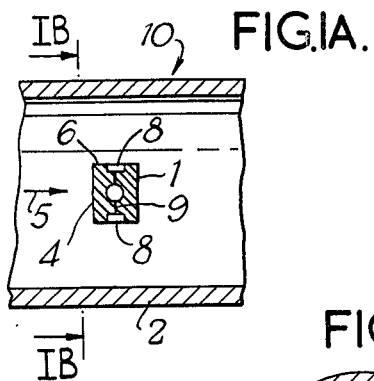
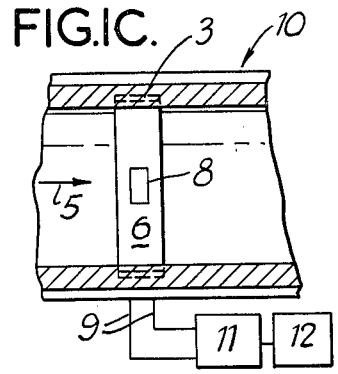
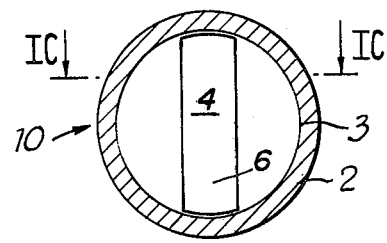
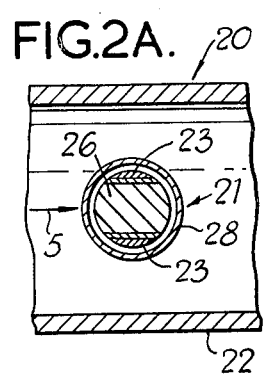
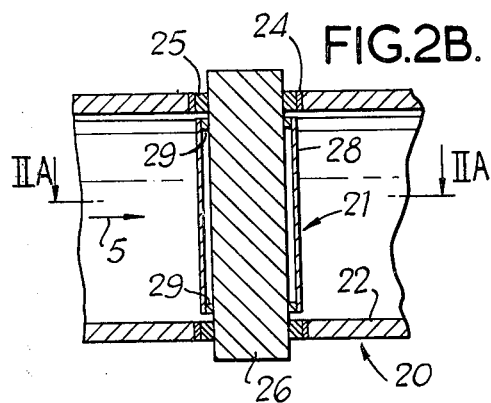
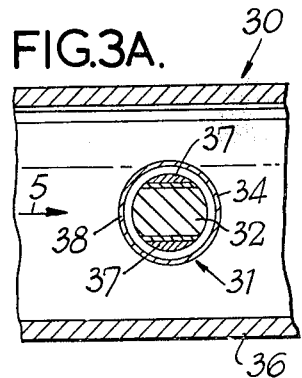
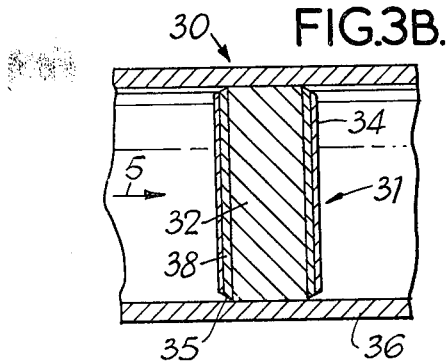

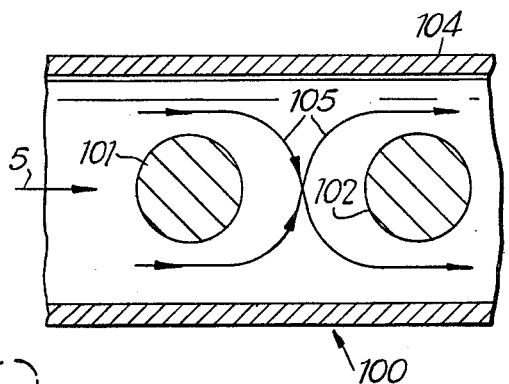
FIG.7.
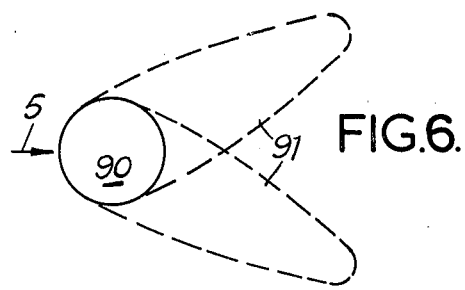
FIG.6.
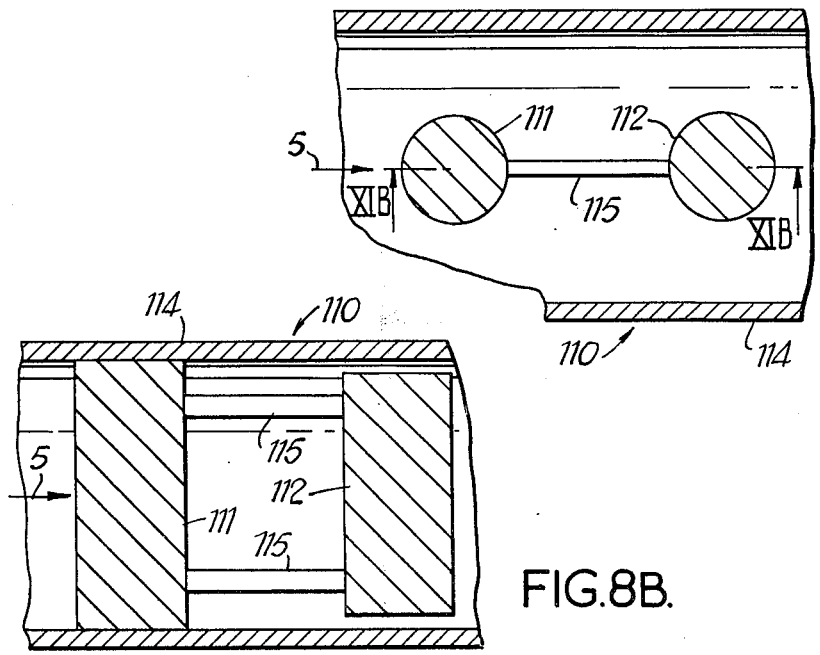
FIG.8A.
FIG.8B.

FLOWMETERS

This is a continuation of application Ser. No. 263,173, filed June 15, 1972, now abandoned.

The invention relates to flowmeters and in particular to flowmeters in which a body is positioned in a conduit confining a fluid flow and an electric signal it derived from the disturbances to the fluid flow caused by the presence of the body.

According to the invention, there is provided a flowmeter comprising a conduit for receiving a fluid flow, a body extending across the conduit and sealed to the conduit wall, and sensing means responsive to disturbances of the fluid flow caused by the body, the sensing means being carried by the body.

In one way of carrying out the invention, the body is a unitary body fixed within the conduit, and the sensing means are responsive directly to the vortices shed by the body in the fluid, so that the body can be rigid. In another way of carrying the invention into effect the body is movable in response to the vortex shedding. The body may be movable as a whole relative to the means by which it is secured within the conduit, or alternatively the body may be constructed so as to have at least a wall portion which moves relative to the rest of the body. The movement of such a wall portion can be sensed directly, or by a secondary fluid flow within the body in response to movement of the wall portions.

In all these ways of carrying the invention into effect, the body is preferably chosen to have a shape which produces well defined vortices in the flowing fluid.

According to a further way of carrying the invention into effect, the body causing the disturbances to the fluid flow is divided into two. Thus two like body portions can be provided one directly downstream of the other. The arrangement here depends less on the formation of the vortices by the body than on the switching of the direction of fluid flow between the bodies. A similar switching of fluid flow direction between the two body portions of the divided body occurs in another apparatus embodying the invention in which there are again two body portions, one spaced downstream of the other, the downstream body portion being secured to the upstream body portion either for pivotation with respect thereto, or for pivotation therewith.

The sensing means employed of course depend on the form of the flowmeter concerned. Where the sensing means is responsive directly to the fluid flow, it is convenient to use heat loss or temperature sensing means. Where the output signal is to be derived from a mechanical movement, a capacitative transducer can be employed, or the movement can be employed to change a magnetic circuit.

It will be appreciated that the body of the flowmeter of the invention must necessarily be such as to generate greater disturbances in the fluid flow than would a steamline body and the body must therefore always be a bluff body in the sense of this term to cover all bodies which are not streamline bodies. Accordingly, the expression bluff body is used herein broadly, to refer to any body capable of causing such greater or additional disturbances to fluid flow in which the body is immersed, and is not limited to that class of bluff body which presents a flat or generally flat face to the flow. In particular, the bluff body of the flowmeters of the invention can comprise a cylinder of circular cross-section, with its axis along a diameter of a conduit. It is nevertheless preferred to employ a bluff body of the kind claimed in U.S. Pat. No. 3,810,388. The shape of the conduit is likewise not limited. Although in practice conduits of circular cross-section will normally be used, conduits of square rectangular or cross-section can readily be employed.

The invention will be better understood from the following illustrative description and accompanying drawings. In the drawings:

FIGS. 1A, 1B and 1C are respectively sectional plan, front and side views of a first flowmeter embodying the invention, FIG. 1B being taken on line 1B—1B of FIG. 1A and FIG. 1C being taken on line 1C—1C of FIG. 1B;

FIGS. 2A and 2B are respectively sectional plan and side views of a second flowmeter embodying the invention, FIG. 2A being taken on the line IIA—IIA of FIG. 2B;

FIGS. 3A and 3B are views corresponding to FIGS. 2A and 2B of a third flowmeter embodying the invention;

FIG. 6 is a schematic side view of an obstacle in a flowing fluid, illustrating the effect thereof on the flow;

FIG. 7 is a sectional plan view of a sixth flowmeter embodying the invention; and FIGS. 8A and 8B are respectively sectional plan and side views of a seventh flowmeter embodying the invention.

Figure 4A:
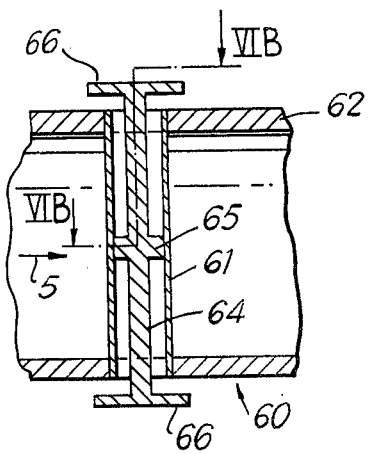
FIGS. 4A and 4B are respectively sectional side and part sectional plan views of a fourth flowmeter embodying the invention, FIG. 4B being taken on the line IVB—IVB of FIG. 4A.
Figure 4B:
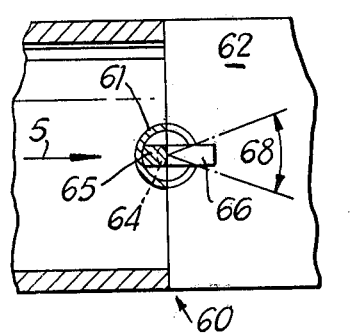

The flowmeter 10 embodying the invention illustrated in FIGS. 1A, 1B, and 1C comprises a bluff body 1 with cylindrical ends and of generally rectangular cross-section extending across a conduit 2 of circular internal cross-section, the longitudinal axis of the body coinciding with a diameter of the conduit. Although the body 1 is shown as extending vertically, it can in practice have any orientation about the axis of the conduit 2. The junction of the ends of the body 1 and the conduit wall is such as to prevent fluid flow therebetween, the ends being preferably sealed by seals 3. The body thus presents a nearly rectangular face 4 at right angles to the fluid flow, the direction of which is indicated by an arrow 5. The rectangular side faces 6 extend parallel to the flow direction. The ratio of the lengths of the faces 4, 6 of the cross-section of the body as seen in FIG. 1A is preferably in the ratio 3/2 as this cross-sectional shape of the body ensures that maximum energy is available for vortex shedding.

As is well known, the body 1 will shed vortices alternately from its front edges, causing oscillations in the fluid flow downstream of these edges. The sensing means incorporated in the flowmeter comprises a pair of temperature sensitive or heat loss detectors 8 each located on a respective one of the side faces 6 of the body, so as to respond to the oscillating fluid flow adjacent the body. Preferably, each detector is mounted in a recess in the face 6 so that the face is smooth. Each detector 3 can comprise a thermocouple, a thermistor or a resistance thermometer. The use of a pair of detectors reduces or eliminates the effects of turbulent acoustic vibration or pulsating noise. The outputs of the two detectors 8 are conveyed by leads 9 to suitable electric circuitry 11 in which the outputs are added or combined differentially to provide a signal for application to indicating and/or control circuitry 12. The circuitry 11, 12 can be conventional and forms no part of the present invention.

The flowmeter 10 thus has a unitary bluff body with sensors responsive only to the characteristics of the flowing fluid. In the embodiments illustrated in FIGS. 2 to 9, the sensing means or detectors are responsive to the movement of at least part of the body due to the disruption of the fluid caused by its presence.

The flowmeter 20 shown in FIGS. 2A and 2B comprises a conduit 22 confining the fluid flow, across which extends a bluff body 21 comprising a combined vortex source and transducer assembly constituting the sensing means. The body 21 is mounted in diametrically opposed apertures in the conduit lined with metal rings 24, associated with suitable sealing arrangements (not shown). Within each ring 24 is an inner ring 25 of compliant material surrounding a heavy cylindrical core 26 which extends across the conduit 22, the mounting being such that the resonant frequency of the core is low compared with the frequency range of the electrical output of the device. The effect of this is to attenuate vibrations carried by the conduit when these have a frequency in the range of the output. A light tube 28 concentrically surrounds the center portion of the core 26 within the fluid flow and extends almost to the conduit wall. The tube 28 is spaced from the core by ring-shaped compliant supports 29, for example of plastic foam, at the ends of the tube. Electrodes 23 are let into diametrically opposed recesses in the core 26 and are shaped so as to conform to the circular cross-section of the core. The electrodes 23 are insulated electrically from the rest of the assembly, all the remaining parts of which are earthed.

In operation, during the passage of fluid along the conduit 22 the body 21 produces vortices the shedding of which results in a transverse force on the light tube 28. This tube therefore undergoes a lateral movement on the compliant supports 29 with resulting variation of the capacitance between the electrodes 23 and earth. As the electrodes 23 are diametrically opposed across the core, movement of the tube 28 towards one electrode will be accompanied by movement of the other side of the tube away from the other electrode. A differential voltage is consequentially obtained between the electrodes and this can be measured by means of a high impedance measuring device.

Although the core 26 is not rigidly supported the ratio of its mass to that of the light cylindrical tube 28 ensures that the core moves very much less than the tube. The signals obtained from the electrodes 23 can be treated as described in connection with the flowmeter 10, as can the signal or signals provided by the sensing means of all the embodiments described herein.

FIGS. 3A and 3B show a third flowmeter 30 embodying the invention, again with capacitive sensing means. A bluff body 31 comprises a cylindrical metal core 32 coaxilly received within a thin walled metal tube 34. The ends of the tube 34 and the core 32 are connected to permit relative transverse movement by a corrugated membrane or slack annular diaphragm 35. The common axis of the core 32 and the tube 34 lies along a diameter of the conduit 36 of the flowmeter. Electrodes 37 are provided at opposite sides of the core 31 and are insulated therefrom. It will be seen that the tiny movements of the tube 34 due to the vortices shed thereby will alter the spacing between the tube and the electrodes 37, so producing an electrical output. The space between the core 32 and the tube 34 is sealed by the membrane 35 and can be filled with oil 38 or other suitable damping medium, to prevent an output being produced due to high frequency vibrations. Instead or additionally, spurious signals can be eliminated by constraining the tube 34 and the core 32 to vibrate in phase.

Alternatively, instead of flexibly sealing the tube 34 to the core 32, the tube can extend across the whole diameter of the pipe and be non-flexibly sealed to the cylinder. The tube can be made sufficiently compliant so that minute transverse movements of its centre region are produced.

The bluff body in the flowmeter 60 embodying the invention shown in FIGS. 4A and 4D comprises a relatively thin walled tube 61 of circular cross-section of which in the axis extends along a diameter of the conduit 62. The ends of the tube 61 are sealed to the conduit wall around diametrically opposed apertures. The tube 61 will cause vortices to be formed in the fluid flowing in the conduit 62 the effect of which is to give rise to oscillating torques on the wall of the tube, so that this wall undergoes tiny tangential movements. These movements may be readily sensed externally of the conduit 62 by means of a generally I-shaped member 64 secured rigidly at the centre of the tube by a cross bar 65. The body 61 imparts oscillatory to the member 64 so that the end arms 66 of this member undergo a resultant angular oscillating movement, very much exaggerated, indicated by the arrow 68 in FIG. 4B. These movements of the arms can be readily employed to provide an electric signal in any convenient way for example capacitatively.

Figure 5A:
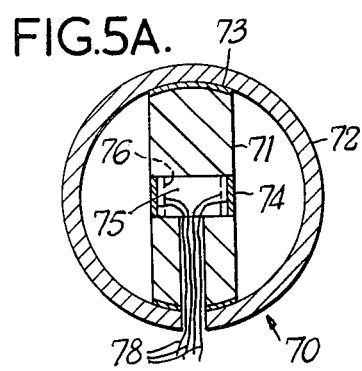
FIGS. 5A and 5B are respectively sectional plan and side views of a fifth flowmeter embodying the invention.
Figure 5B:
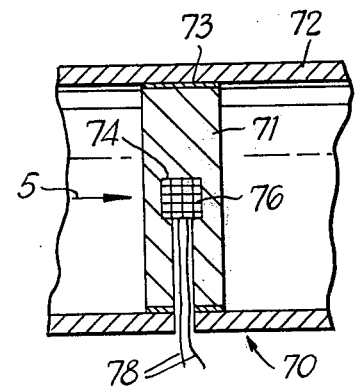

The flowmeter 70 embodying the invention shown in FIGS. 5A and 5B comprises a bluff body 71 having rectangular cross-section or the form of a cylinder of circular cross-section, secured within a conduit 72 so as to extend along a diameter of the conduit. The ends of the body 71 are sealed to the conduit wall by sealing means 73. At opposed sides of the body 71, a pair of flexible sheet members 74 for example of thin metal, such as steel foil, or of plastics material carrying a conductive plate or having a conductive coating are sealed at their edges to corresponding apertures in the cylinder wall. The sheet members 74 constitute the ends of an oil-filled passage defined by a duct 75 extending across the cylinder.

The body 71 will cause vortices to be formed in a fluid flowing along the conduit 72. These vortices will be shed alternately on the two sides of the body so that an alternating pressure difference will be experienced at these two sides. The two sheet members 74 will accordingly be deformed in and out, moving together in the same direction, with a consequent reciprocating flow of oil along the length of the duct 75.

The movement of the flexible sheet members 74 can be sensed capacitively. The flexible sheet members 74 or if these are of plastics material, the conductive plate or coating which each carries constitutes a movable electrode which co-operates with a fixed electrode 76 in the form of a metal grid extending across the duct at a position slightly spaced from each of the sheet members. Leads 78 extends from the electrodes through a passage in the body 71 to appropriate electric circuitry (not shown), as described in connection with FIGS. 1A, 1B and 1C.

It will be appreciated that the arrangements so far described will operate independently of the direction of fluid flow within the conduit, because of the symmetrical shape of the bluff body.

Referring to FIG. 6, the vortices due to an obstacle 90 in a flowing fluid can be regarded, according to Birkoff's Theory, in terms of a lobe 91 of fluid shown in dotted lines oscillating on either side of a straight-through position under the influence of lift and drag forces Birkoff's Theory shows that the frequency of oscillation $f$ can be shown to be proportional to the velocity V of fluid flow. If now a body of density $\rho_c$ is attached to the obstacle by means permitting pivotation, it can be predicted, and has been at least approximately found, that Birkoff's Theory can be extended to show that $f \alpha\ V\ \sqrt{\rho/\rho_c}$ where $\rho$ is the density of the fluid. The frequency of oscillation $f$ of the body is not equal to the vortex shedding frequency. By providing a body downstream of the obstacle 90, the fluid flow between the obstacle and the body can be made to switch or alternate in direction with frequency $f$.

As shown in FIG. 7, a flowmeter 100 embodying the invention can comprise a bluff body having an upstream body portion 101 and a downstream body portion 102. The two fixed body portions are both cylinders of circular cross-section with their axes extending on spaced parallel diameters of a conduit 104. The body portions produce flow switching in the gap between them as indicated by the arrows 105. Referring to Birkoff's oscillating lobe concept mentioned above, if the downstream half, say, of the lobe is impeded from oscillation by the insertion of the second body, the upstream half continues to oscillate, causing a switching flow effect between the two fixed bodies. The sensing means of the flowmeter 100 can comprise one or more heat loss detectors located on one or both of the body portions 101, 102 or on the inner wall of the conduit 102.

In the flowmeter 110 shown in FIGS. 8A and 8B, the disturbance to the fluid flow is again caused by a pair of body portions 111 and 112 of the same general shape and location in a conduit 114 as the body portions 101 and 102 of FIG. 7. However, only the body portion 111 is secured to the conduit wall and the body portions are linked by elongated members 115 which permit oscillation of the body portion 112 from side to side. Alternatively, the members 115 can be inflexible and pivoted at the point of attachment to the upstream body portion 110. In a further modification, the two body portions 111, 112 again form a rigid structure which is pivoted to the conduit wall about the axis of the upstream body portion. The oscillations of the body portions obtained are of large amplitude.

Although any kind of sensing means can be employed as previously described, there is adequate energy for a mechanical pick-off for example a cyclometer type counter to be used. Because of the dependence of density on pressure in the case of gases, this type of flowmeter is better confined to use with liquids.

It will be understood that it is within the invention appropriately to employ features of some of the embodiments described in other of the embodiments. The bluff bodies employed are not limited in shape to the rectangular and circular cross-sections described but can be selected as required. Similarly the shape of the conduit confining the fluid flow can be of any appropriate shape. In particular, it is advantageous to select the relative dimensions of the bluff body and the conduit so that the flowmeter embodies the invention of U.S. Pat. No. 3,810,388.

I claim:

1. A flowmeter comprising a conduit for receiving a flow of fluid, an elongated bluff body of rectangular cross section, means for mounting the bluff body so that the body extends across the conduit and causes vortices to be generated in fluid flowing along the conduit past the body, and sensing means responsive to the formation of the vortices and adapted to generate an electrical signal representative of the rate of generation of the vortices, and hence of the rate of flow of fluid, said sensing means comprising a pair of sensors mounted on the body on opposite sides thereof downstream of a side of the body which faces the flow of fluid.

2. A flowmeter as claimed in claim 1, wherein the ratio of the width of a first pair of opposite sides of the body, which sides are arranged generally normal to the direction of fluid flow, to the width of a second pair of opposite sides is substantially equal to 3:2.

3. A flowmeter as claimed in claim 1, wherein the sensing means comprise at least one heat loss detector.

4. A flowmeter as claimed in claim 1, wherein the sensing means comprise temperature-sensing means.

5. A flowmeter as claimed in claim 1, wherein the rectangular cross section of said bluff body extends substantially full width of said conduit.

6. A flowmeter as claimed in claim 1, wherein there is provided on each of the said opposite sides of the body a part which is movable relative to the remainder of the body, and each sensor is adapted to sense movement of a respective one of the parts and to generate an electrical signal representative of that movement, and hence of the rate of generation of vortices and of the rate of flow of said fluid.

7. A flowmeter as claimed in claim 6, wherein each movable part is a flexible wall portion and the two wall portions are spaced apart transversely of the conduit and form respective end walls of a duct which extends through the body, whereby the generation of vortices in the fluid alternatively at opposed sides of the body causes movement of the flexible wall portions in synchronism alternately in one sense and then in the opposite sense.

8. A flowmeter as claimed in claim 7, wherein said duct contains a fluid and means sealing said duct from fluid in the conduit.

9. A flowmeter as claimed in claim 6 in which each sensor is a capacitative sensor.

10. A flowmeter as claimed in claim 9 wherein each flexible wall portion comprises conductive material and cooperates with a fixed electrode to form a capacitative sensor.

11. A flowmeter as claimed in claim 6, wherein each sensor is a magnetic sensor.

\* \* \* \* \*